United States Patent [19]

Caneba

[11] Patent Number: 5,173,551
[45] Date of Patent: Dec. 22, 1992

[54] FREE-RADICAL RETROGRADE PRECIPITATION-POLYMERIZATION PROCESS

[75] Inventor: Gerard T. Caneba, Houghton, Mich.

[73] Assignee: Board of Control of Michigan Technological University, Houghton, Mich.

[21] Appl. No.: 491,288

[22] Filed: Mar. 9, 1990

[51] Int. Cl.⁵ .................. C08F 2/14; C08F 12/08
[52] U.S. Cl. .................. 526/208; 526/77; 526/209; 526/218.1; 526/219; 526/219.6; 526/227; 526/328; 526/329.2; 526/329.7; 526/346; 526/347; 526/912
[58] Field of Search ............ 526/208, 209, 219.6, 526/236, 328, 329.7, 346, 218.1, 219, 227, 347, 329.2

[56] References Cited

U.S. PATENT DOCUMENTS

| | | | |
|---|---|---|---|
| 2,520,338 | 8/1950 | Robertson | 526/219 X |
| 2,979,492 | 4/1961 | Governale et al. | 526/88 X |
| 3,932,371 | 1/1976 | Powers | 260/85.3 R |
| 3,954,722 | 5/1976 | Echte et al. | 526/68 |
| 3,956,251 | 5/1976 | Feiler et al. | 526/73 |
| 3,965,083 | 6/1976 | Jezl et al. | 526/65 |
| 4,076,921 | 2/1978 | Stol et al. | 526/930 X |
| 4,129,701 | 12/1978 | Jezl et al. | 526/65 |
| 4,267,103 | 5/1981 | Cohen | 526/923 X |
| 4,319,021 | 3/1982 | Irani et al. | 528/498 |
| 4,444,922 | 4/1984 | Gutowski et al. | 523/339 |
| 4,528,337 | 7/1985 | Kreilein et al. | 526/70 |

OTHER PUBLICATIONS

"Intermettency in Nonisothermal CSTR", by G. R. Caneba, Barbara Densch AIChE Journal, Feb. 1988, vol. 34, No. 2.

*Primary Examiner*—Fred Teskin
*Attorney, Agent, or Firm*—Daniel H. Bliss

[57] ABSTRACT

A free-radical retrograde polymerization process for forming a polymer. An admixture of reactants including predetermined amounts of a monomer, a solvent, and a free-radical-initiator is reacted. A precipitation polymerization reaction occurs such that a polymer-rich phase is at a temperature generally above the lower critical solution temperature (LCST) of the admixture.

17 Claims, 2 Drawing Sheets

FREE-RADICAL RETROGRADE PRECIPITATION-POLYMERIZATION PROCESS

SUMMARY OF THE INVENTION

1. Field of the Invention

The present invention relates generally to a polymerization process, and more particularly, to a free-radical retrograde precipitation polymerization process.

2. Description of Related Art

With the increased one of polymers in many commercial applications, there has been a commensurate need to efficiently produce such polymers. Among the conventional processes for making narrow molecular weight distribution polymers, such as homopolymers, copolymers and/or macromers, including those containing a styrene monomer, are ionic polymerization, precipitation polymerization and supercritical-fluid precipitation polymerization methods. Unfortunately, each of the above methods suffers disadvantages that could render such method undesirable in many applications, such as commercial-scale applications.

For example, without limitation, relatively expensive equipment and procedures are generally needed to assure that reactive components for ionic polymerization systems are clean and substantially free of contaminants. Moreover, ionic polymerization reaction conditions require relatively low temperatures and high vacuum conditions. Unless the above conditions are satisfied there generally will be little or no yield of polymer from the process.

With conventional precipitation polymerization methods, successful polymerization to obtain a relatively narrow molecular weight distribution of a polymer, such as polystyrene, generally occurs only at conversions below 0.8%. Thus, relatively expensive equipment is needed, and operating costs are high, in order to assure adequate recycling of substantial amounts of monomer. Further, many conventional precipitation polymerization operations could result in uncontrollable rates of polymer propagation. Thus, an undesirable "popcorn" effect may occur.

With supercritical fluid precipitation polymerization methods, high pressures are generally required to keep reactants in a liquid phase. Thus, as with the above methods, and expensive equipment relatively high operating costs are necessary.

A two-phase coordination polymerization process (involving Ziegler-type catalysts) for preparing polymers, including copolymers of isoolefins and conjugated diolefins, is disclosed in U.S. Pat. No. 3,932,371, which is hereby expressly incorporated by reference.

A free radical initiated suspension polymerization process is disclosed in U.S. Pat. No. 3,956,251, which is hereby expressly incorporated by reference. Additional U.S. patents that relate to polymerization processes include U.S. Pat. Nos. 2,979,492; 3,954,722; 3,965,083; 4,129,701; 4,319,021; 4,444,922; and 4,528,337.

SUMMARY OF THE INVENTION

The free-radical retrograde polymerization processes of the present invention include the steps of:

(1) forming an admixture of reactants including predetermined amounts of:
 (a) a monomer;
 (b) a solvent; and
 (c) a free-radical-forming agent (e.g. initiator or catalyst);

(2) initiating a free-radical polymerization reaction in to form a plurality of polymer radicals;

(3) precipitating a polymer from said polymer radicals; and (4) maintaining a polymer-rich phase of the admixture at a temperature generally above the Lower Critical Solution Temperature (LCST) of the admixture.

In a highly preferred embodiment the free-radical-forming agent of step (1)(c) is azobisisobutyronitrile ("AIBN"). The methods and processes of the present invention provide an improved technique for the polymerization of many commercially important polymers (such as those containing a styrene monomer). The methods provide high overall yields of such polymers. The polymers produced by the present methods exhibit a relatively narrow molecular weight distribution (e.g. with a heterogeneity index potentially as low as about 1.01), which can range in molecular weight from a few hundred to a few million. Using the present methods, substantially complete conversions are also possible within commercially reasonable processing times. A reduction of undesirable "hot spots" is also possible.

The operating conditions of the present methods do not necessarily require the employment of complex or expensive equipment or procedures, nor extensive preparation of various commodity reactants. Thus, the present methods are potentially more economically feasible than previous polymerization methods. As a result of the present methods, many commercially desirable polymers, the processing of which was heretofore impractical using prior methods, can be readily produced.

DETAILED DESCRIPTION OF THE PREFERRED EMBODIMENT

Figure 1:
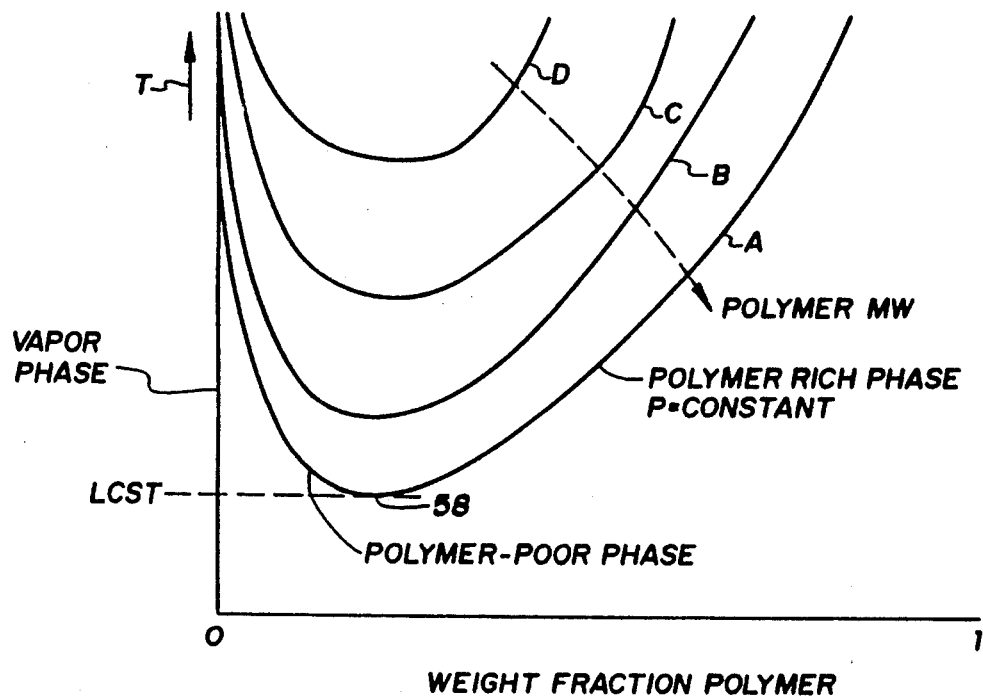
FIG. 1 is a phase diagram of temperature versus weight fraction polymer for a typical polymer/solvent system in which the polymer is capable of being formed by precipitation polymerization, and where lines A–D correspond respectively with polymers of generally increasing molecular weight.

By "polymers" as used herein is meant commonly encountered polymers of the type such as homopolymers, macromers or macromonomers, copolymers, or mixtures thereof. Relatively high yields of a variety of commercially important polymer materials can be produced using the free-radical retrograde precipitation polymerization methods and processes of the present invention. More particularly, the methods and processes of the present invention can be advantageously employed to produce an unexpectedly high yield of narrow molecular weight distribution free-radical based polymers such as styrene (S), or those based on monomeric units such as methyl methacrylate (MMA), hydroxyethyl methacrylate (HEMA), vinyl chloride (VC), vinylidene chloride (VDC), butyl acrylate (BA), butylene (Bu), ethylene oxide (EO), ethylene (E), butadiene (B), isoprene (I), vinyl acetate (VAc), vinyl alcohol (VOH), acrylonitrile (AN), acrylamide (AMD), vinyl butyral (VBL), acrylic acid (AA), and mixtures thereof.

Particular examples of copolymers contemplated for production within the methods and processes of the present invention include, without limitation, those based on monomeric units (abbreviated using the above notation) such as S/E/Bu, S/B, S/I, MMA/BA, S/VAc, MMA/VAc, VC/VAc, S/VOH, MMA/HEMA, MMA/VOH, S/VBL, E/VBL, B/VBL, S/EO, S/B, S/I, S/E/Bu, VC/E, AN/VAc, AN/E and mixtures thereof.

It is believed that these copolymers could be useful in a number of environments. For instance, without limitation, S/E/Bu, S/B, S/I, MMA/BA, S/VAc, MMA/VAc, VC/VAc block copolymers may yield useful relatively environmentally safe pressure-sensitive and hotmelt adhesives. S/VOH, MMA/HEMA, MMA/VOH block copolymers might provide useful hydrogel types of materials that could be used in physiological applications. S/VAc, S/VOH block copolymers might provide useful stabilizers for processing of polymer composite and asphalt materials. Additionally, their water-absorbing components might be used to force hydrophilic domains into 100-Angstrom sized regions of multiphase materials. S/VBL, E/VBL, B/VBL block copolymers may provide useful interfacial materials for coupling glass with plastics or rubbers. For example, in polymer composites, glass fibers might be made to more easily bond with the dispersing polymeric matrix. Finally, S/EO block copolymers could be useful as foaming agents.

In a highly preferred embodiment, the methods and processes of the present invention are employed in the production of polystyrene, methyl methacrylate, or butylacrylate polymers. Still even more preferred, the present methods and processes are employed to produce polystyrene polymers ranging in molecular weight from about 500 to about 5,000,000, and more preferably from about 1000 to about 100,000. The polymers produced by the methods and processes of the present invention typically will have a heterogeneity index (HI) of as low as about 1.2. In some instances the HI could be as low as about 1.01. By heterogeneity index as used herein is meant the ratio of the weight average molecular weight to number average molecular weight as measured experimentally using size exclusion chromatography methods.

The methods and processes of the present invention generally include the steps of:
(1) forming an admixture of reactants including predetermined amounts of:
  (a) a monomer;
  (b) a solvent; and
  (c) a free-radical-forming agent (e.g. initiator catalyst);
(2) initiating a free-radical polymerization reaction to form a plurality of polymer radicals;
(3) precipitating a polymer from said polymer radicals; and
(4) maintaining a polymer-rich phase of the resulting admixture at a temperature generally above the Lower Critical Solution Temperature (LCST) of the admixture.

It should be appreciated that in order to produce copolymers, such as block copolymers and/or graft copolymers, according to the present methods and processes, a second monomer could be introduced into the reactor system, preferably after the monomer of step (1)(a) has begun to react. The remaining steps then could be repeated until the desired copolymer is produced.

Symmetric types of block copolymers (such as an ABA triblock, ABCBA multiblock, etc.) may also be made using the present methods and processes by allowing the respective polymer radicals of two or more different monomers to terminate by combination with each other. Where this is desired, such a combination reaction should preferably be run under suitable conditions in which polymerization kinetics would favor combination rather than disproportionation. For instance, this could be effected by changing reaction conditions in such a way that the admixture of reactants becomes a "true" or substantially single phase solution (e.g., by lowering the temperature substantially below the LCST, by increasing the pressure to a suitable pressure to cause the polymer rich phase to dissolve into the solvent, and/or by adding a suitable diluent (like toluene for the case of polymerization of styrene) that acts as a relatively good solvent for the resulting polymer).

It will further be appreciated that to make various macromonomers or macromers (i.e. polymers with reactive chain ends), a functional initiator such as an acid-functional initiator, a base-functional initiator, or mixtures thereof could be used instead of a nonfunctional initiator such as AIBN. Alternatively a macromonomer could be produced by an additional step of terminating polymer radicals from a nonfunctional or monofunctional initiator with suitable functional chain transfer agents.

It will be appreciated that when the resulting polymer is terminated by a nonfunctional radical, scavenger, chain transfer agent, etc., the resulting macromonomer can be monofunctional. An acid group at the end of the chain can react with a base. If, on the other hand, the polymer radicals are terminated by combination, then a difunctional macromonomer can be produced.

Figure 2:
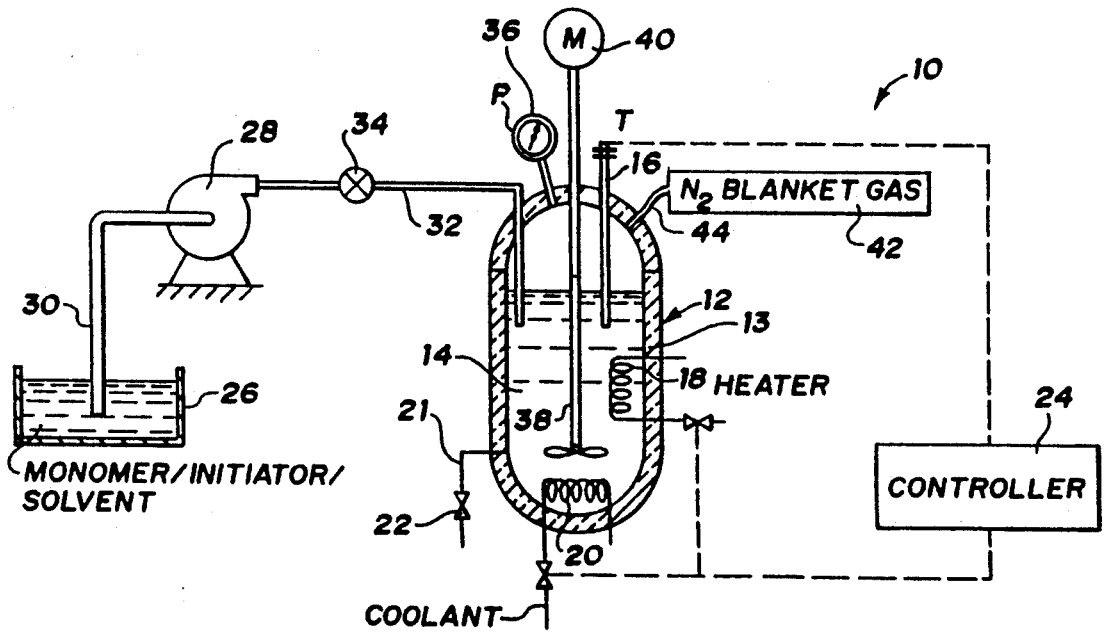
FIG. 2 is a schematic of a preferred system for carrying out a method of free-radical retrograde precipitation polymerization according to the methods and processes of the present invention.

In a preferred aspect of the present invention, a reactor system suitable for precipitation polymerization methods is provided. For instance, a preferred reactor system 10 is shown in FIG. 2. The present preferred system 10 is generally known as a stirred tank reactor vessel ("STRV") system. Thus, the system 10 includes a reactor, generally indicated at 12, such as a stirred tank vessel reactor. Suitable laboratory reactors are commercially available from Parr Instruments, Inc. The reactor 12 includes a housing 13 having a sealable reaction chamber 14 defined therein. The reactor, including the housing 13 and reaction chamber 14, is preferably constructed from materials suitable to withstand the operating temperatures and pressures employed in the present methods. Moreover, the material is preferably substantially non-reactive with the reactants employed in the present methods. Accordingly, the housing and reaction chamber is preferably manufactured from suitable stainless steels and/or suitable nickel or cobalt-based alloys, such as a suitable Hastelloy-type alloy. In the present preferred embodiment the volume of the reaction chamber 14 could range from several milliliters to several thousand of liters, depending upon the required production output requirements.

A temperature sensor or probe 16 extends through the housing 13 and into the chamber 14 to measure temperature within the chamber 14. The system 10 also includes a heating and cooling system for controlling the temperature within the system 10. In this regard the system has a heater 18 to permit heating of materials contained within the chamber 14. Preferably the heater 14 is a coiled conduit disposed within the chamber 14 and having an inlet and outlet extending through the housing 13 in which a heated fluid flows. It should be appreciated, however, that any suitable alternative system to permit heating the contents within the chamber 14 may be used. For instance, heating could be accomplished by the employment of steam, or by the use of a suitable electrically heated jacket. Further, temperature of the reactor system may also be controlled using suitable insulation or a heating mantle.

Preferably the system 10 further includes a suitable cooler 20 to permit cooling of the materials within the chamber 14. The cooler may be a coiled conduit disposed near the bottom of the chamber 14 and having an inlet and outlet extending through the housing 13 in which a coolant fluid flows or a cooling jacket system could also be employed. It should be appreciated that any suitable coolant fluid to permit cooling the contents within the chamber 14 may be used such as water, ethylene glycol, or a coolant sold by Dow Chemical Co. under the trade name DOWTHERM.

A conduit 21 that penetrates the housing 13 at the bottom thereof is provided to allow the materials that are contained in the chamber 14 to exit from the reactor 12. A valve 22 (such as one that is suitable for pressure and temperature service conditions of about 300 psig and 150° C., respectively) is provided on the conduit 21 to permit control of the flow of materials exiting the chamber 14.

A control unit 24, such as a temperature controller, is electrically connected to the temperature sensor, heater and the cooler to allow for monitoring and regulating of the temperature within the chamber 14 of the reactor 12.

The system 10 also includes a reservoir 26 for containing an admixture of one or more of the monomer, initiator or solvent. The reservoir 26 preferably has a volume that is sufficient to contain fluid that is injected into the reactor. Further, the reservoir is also preferably connected to a source (not shown) of the monomer, solvent and initiator, and is capable of supplying each one of these constituents individually, or in combination with each other, to the chamber 14. Preferably the system is adapted so that the initiator may be dissolved in the monomer or solvent (preferably in the monomer) prior to its introduction into the reservoir 26.

The reservoir is preferably spaced apart from the chamber 14. A pump 28, which is interconnected by conduit 30 between the reservoir 26 and the chamber is provided for pumping at one or more predetermined flow rates from the reservoir 26 to the chamber 14 the admixture contained in the reservoir. In this regard, a conduit 32, having a control valve 34 for controlling the flow of the admixture therethrough, is connected to the outlet of the pump 28 and extends to the housing 13 into the chamber 14 of the reactor 12.

The system 10 also includes a pressure probe, sensor or gage 36 extending through the housing 13 and into the chamber 14 to allow for measurements of the pressure within the chamber 14. A stirrer or mixer 38 extends through the housing 13 from a top end thereof and into the chamber 14 for stirring or mixing materials contained within the chamber 14. The mixer 38 includes a drive mechanism, such as a motor 40, for rotating the mixer 38 at a predetermined rotation rate, preferably of about 300 rpm to about 600 rpm during the methods and process of the present invention. The system 10 further includes a source 42 of a substantially non-reactive, or inert gas, such as nitrogen ($N_2$) gas or argon gas. Such gas preferably can be flowed through a conduit 44 into the chamber 14 in order to act as a blanket of gas for pressurizing the chamber 14, to help exclude oxygen, and to help keep the admixture of reactants generally in a preferred substantially liquid phase.

Figure 3:
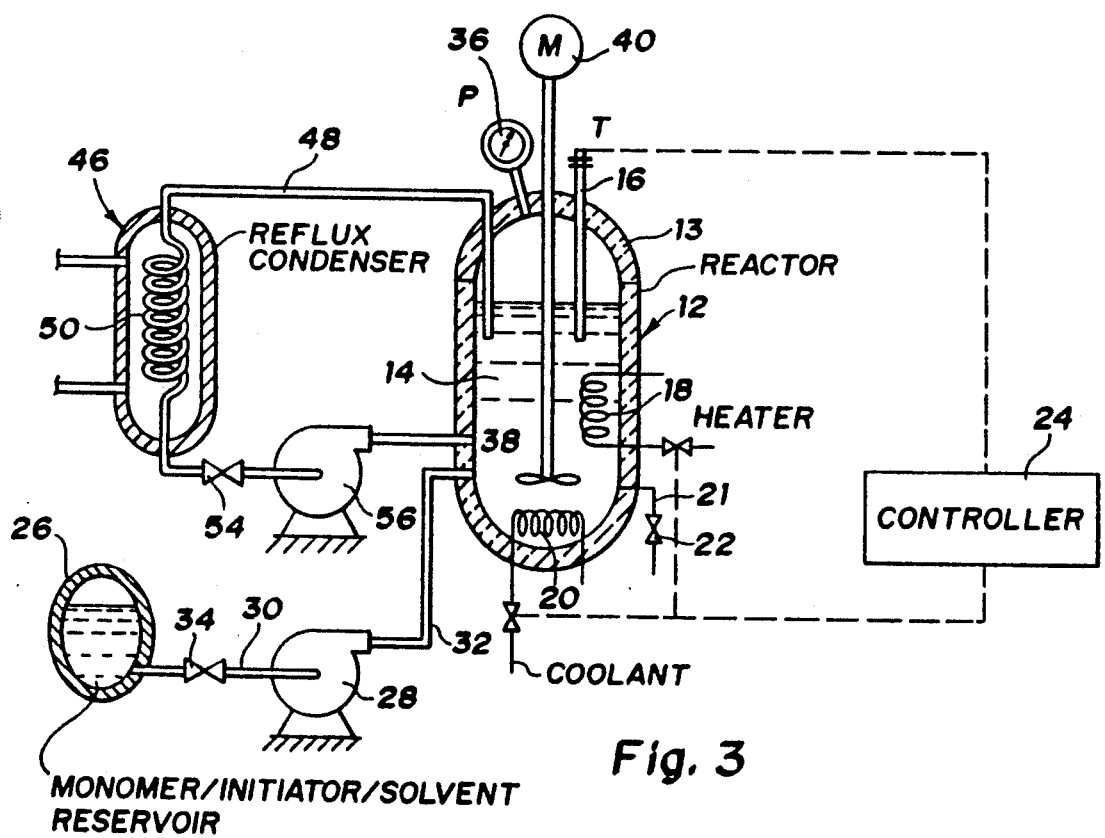
FIG. 3 is a view similar to FIG. 2 of an alternate system for carrying out a method of free-radical retrograde precipitation polymerization according to the methods and processes of the present invention.

An alternative reactor system is shown in FIG. 3. The system of FIG. 3 is substantially the same as that described above and shown in FIG. 2, except for the inclusion of a suitable reflux condenser 46 (being provided, at least in part, for additional control over heating and cooling) being connected to the reactor 12 via a conduit 48. The conduit 48 preferably penetrates through the walls of the condenser, and has a coiled portion 50 disposed within a condenser chamber 52. A suitable valve 54, and a pump 56, is also provided along the conduit 48 for controlling the flow of materials therethrough and into the reactor.

One skilled in the art will also recognize that suitable reactors may also include a reactor with a tubular chamber. In such a system, the temperature of the reactor can be monitored and controlled outside of or within the reactor. Pressure of the reactor, in turn, can be monitored and controlled using fluid outflow from the system.

It should be appreciated that the above systems lend themselves relatively well for the monitoring and controlling of either reactor pressure or temperature using known methods. For instance, upon initially introducing a solvent into the reactor, the pressure versus temperature relationship of the solvent can be established. Deviations from such an established relationship can be monitored and adjustments to temperature and pressure can be made accordingly.

The methods and processes of the present invention are described in connection with the preparation of polymers using a styrene, butyl acrylate, and/or methyl methacrylate monomer. However, it will be appreciated that the methods and processes of the present invention are susceptible to slight modification to produce a variety of polymers. Alternative monomers may be employed in the present invention to form polymers such as those previously listed above. The present description thus is not intended to be limiting of the scope of the methods and processes of the invention.

An admixture (which is preferably liquid or fluid) of reactants including monomer, initiator, and solvent is prepared by introducing one or more predetermined amounts of each into the above preferred reactor system of FIG. 2. Accordingly, in a preferred method for producing polystyrene, a predetermined amount of each of styrene monomer, initiator, and solvent is introduced into the reactor system 10. In the preparation of polystyrene, preferably upon introduction of the styrene monomer into the system, it already has been purified or processed in a manner sufficient to potentially minimize the presence of free radical scavengers in the admixture of reactants. Examples of suitable purification or processing methods for this purpose are discussed in more detail further herein. The initiator is introduced into the system either by itself or having already been admixed with solvent or monomer. Preferably, however, the initiator is introduced into the present reactor system already having been admixed with the monomer.

Preferably, a suitable solvent is selected such that the polymer-rich phase of the admixture that ensues during polymerization can be maintained in the reactor system at a temperature above the Lower Critical Solution Temperature ("LGST") of the admixture. By "LCST" as used herein is meant the temperature above which a polymer will become less soluble in a solvent/polymer admixture as the temperature of the admixture is increased. Thus, referring to FIG. 1, the LCST for curve A would be designated generally by reference numeral 58. Also, the solvent is preferably such that the viscosity of a resulting polymer-rich phase is suitable for mixing. Additionally, the solvent is preferably such that its employment will help minimize the amount of free-radical scavengers that may be present in the admixture of reactants.

In the present preferred embodiment which employs a styrene, butyl acrylate and/or a methyl methacrylate monomer, therefore, suitable solvents include organic and inorganic solvents and preferably are selected from the group consisting of acetone, methylethylketone, diethyl-ether, n-pentane and mixtures thereof. The solvent is also preferably employed in its fractionally distilled form.

The initiator, in turn, is preferably selected from suitable free-radical producing initiators (as opposed to coordination type initiators, such as Ziegler-Natta catalysts), or mixtures thereof. Preferably the initiator is suitable for accomplishing free radical initiation by the use of one or more mechanisms such as photochemical initiation, thermal initiation, redox initiation, degradative initiation, ultrasonic initiation, or the like. In a highly preferred embodiment, the initiators are selected from azo-type initiators, peroxide type initiators, or mixtures thereof. For example, without limitation, suitable peroxide-type initiators would include diacyl peroxides, peroxy esters, peroxy ketals, di-alkyl peroxides, hydroperoxides or mixtures thereof.

Particular examples of peroxide type initiators thus include without limitation, benzoyl peroxide, deconoyl peroxide, lauroyl peroxide, succinic acid peroxide, cumere hydroperoxide, t-butyl peroxy acetate, 2,2 di (t-butyl peroxy) butane di-allyl peroxide), cumyl peroxide, or mixtures thereof.

Preferred azo-type initiators include initiators such as azobisisobutyronitrile (AIBN), 1,1'-azobis (1-cyclohexane carbonitrile), or mixtures thereof. Also preferred (such as for producing macromers) are acid-functional azo-type initiators such as 4,4'-azobis (4-cyanopentanoic acid) [available through Wako Chemicals, Inc. under the tradename V-501] or the like. A highly preferred initiator for employment in the present methods is AIBN.

It will also be appreciated that the present methods and processes permit for the presence of minor amounts of additional constituents within the admixture of reactants. Preferably, however, care is taken to minimize the presence of scavenger constituents that might inhibit the desired free radical reactions capable within the present preferred system (e.g. DPPH, chloranil, $CuCl_2$, sulfur, or the like). Thus, to help minimize the presence of undesired scavengers in the admixture of reactants one or more of following steps are preferably performed: (1) removing inhibitor that may be present initially in the monomer by extraction with a caustic solution (such as an aqueous soldium hydroxide (NaOH) solution), followed by extraction of excess caustic material with distilled water and vacuum fractional distillation (e.g. using a middle fraction under a reduced pressure), or by passing the monomer through an ion exchange resin column; (2) bubbling nitrogen gas for a predetermined amount of time through the admixture of reactants; or (3) blanketing the reactor chamber with a substantially non-reactive gas, such as nitrogen, preferably at a pressure greater than that of the solvent vapor pressure.

Prior to the introduction of monomer and initiator into the reaction system it is preferred that a predetermined amount (i.e. in the range of about 0 to about 90 percent by volume of the reaction chamber) of solvent be introduced by itself (or bubbled with substantially inert gas) into the reaction chamber 14. The chamber (and the solvent) is heated to one or more predetermined temperatures, and pressurized to one or more predetermined pressures. Preferably the steps of heating and pressurizing the chamber also includes the steps of evacuating the chamber 14 to about 0 psig and then introducing nitrogen gas into the chamber. In the present preferred method of making polystyrene, the chamber and solvent (which is preferably acetone) are thus heated to a temperature of about 110° C., in a chamber atmosphere of nitrogen gas maintained at a pressure of about 60 psig. The chamber 14 is maintained under those conditions for a predetermined amount of time, which is preferably at least about 10 minutes.

One or more predetermined amounts of an initiator/monomer admixture or an initiator/solvent/monomer admixture, which preferably has been maintained in the reservoir at about room temperature is then flowed, bubbled with a substantially inert gas, or otherwise introduced into the reactor chamber. The flow rate of the admixture preferably is such that the time required for introducing each of the reactants into the reactor ranges from about 0 to about 1000 minutes or longer depending upon the volume percent that each reactant occupies with the reaction chamber, and depending upon the size of the reaction chamber.

The initiator preferably is introduced at a proportion ranging from about zero to about 15,000 milligrams of initiator per milliliter of monomer injected, and more preferably in the range of about zero to about 100 milligrams initiator per milliliter of monomer injected. It is further contemplated that the initiator is introduced in a range of about $1 \times 10^{-7}$ to about 10 milligrams of initiator per milliliter of monomer injected. The amount of solvent is preferably of about the same general order of magnitude as the monomer. However, it may be more or less depending upon factors such as the particular operating conditions and kinetics desired, and the characteristics desired in the final polymer.

After the reactants are introduced into the reaction chamber, the chamber 14 is sealed shut; the reaction chamber is heated and presurized; a polymerization reaction is initiated in a suitable manner; and the reactants are allowed to react (to precipitate a polymer) at a substantially constant temperature and pressure for a predetermined amount of time. Preferably to prepare a polystyrene polymer, the temperature of the polymer-rich phase is maintained at one or more temperatures above the LCST of the polymer/solvent system in question. Thus, for a present preferred system including polystyrene and acetone, the reaction temperature is maintained at a temperature of at least about 60° C., and more preferably in the range of about 80° C. to about 120° C. and still more preferably about 90° C. to about 110° C.

The pressure of the reactor is preferably controllable by suitable methods such as by introducing a blanket of nitrogen gas, and/or by taking advantage of the pressure derived from the vapor phase of the admixture of reactants that is in substantial equilibrium with the liquid phases of the admixture. The present polymerization reactions preferably occur at one or more reactor pressures greater than about 40 psig, more preferably in the range of about 50 to about 100 psig, still more preferably about 60 to about 90 psig, and even still more preferably about 60 to about 70 psig.

It is preferred that for producing polymers, such as polystyrene, the times for a substantially complete reaction to occur be about 0.1 seconds to about 100 hours. Longer reaction times are also within the scope of the present methods. Reaction times will depend upon a number of factors including, without limitation, the yield and characteristics of polymer product desired as well as the types of reactants, and the reaction conditions.

One skilled in the art will recognize that the steps of introducing solvent, initiator, and monomer into the chamber 14 need not be carried out simultaneously. They can be introduced in combination, individually, or in a series of such introduction steps. Thus, any sequence of introduction steps suitable to achieve polymerization is within the scope of the present methods. Moreover, the proportions of monomer, solvent, and initiator can be widely varied to take into account the desired yield and characteristics of the polymer produced and the desired kinetics of the polymerization reaction.

Once polymerization begins, the system can be monitored and regulated to control the structure and properties of the resulting polymer. The reaction also can be monitored and controlled to produce desired yields of a polymer having a particular range of molecular weights. For instance, without limitation, the rate of propagation and termination of precipitated polymer radicals is controllable using suitable methods (such as by raising the pressure or lowering temperature of the system and/or adding one or more additional reactants to the system) to form polymers having specifically desired characteristics.

Termination of precipitated polymer radicals can be accomplished by one or more steps such as reducing the temperature of the reaction chamber (e.g. to about 20° C. below the operating temperature of the reaction chamber); increasing the pressure within the reaction chamber (e.g. to about 100 psi above the operating pressure of the reaction chamber); adding a suitable solvent for the resulting polymer (e.g. up to about 20 volume percent toluene for the case of polystyrene or, alternatively, additional monomer, if the monomer is such that it acts as a good solvent for the resulting polymer); adding a suitable chain transfer agent (e.g. a mercaptan type agent) to the system; introducing a suitable radical scavenger (e.g. oxygen); or by vaporizing some of the solvent in reactor, if there is any remaining unreacted monomer, and if the monomer is a good solvent for the resulting polymer or combinations of the above. Additional agents, such as suitable swelling agents, may also be added to the reactor to assist in the above steps.

In short, without intending to be bound by theory, the present methods and processes take advantage of the characteristics of various polymer/solvent systems that are ascertainable by a study of their respective phase diagrams. These phase diagrams characteristics, in turn, can be ascertained through the use of known methods such as is disclosed in U.S. Pat. No. 3,932,371 (hereby expressly incorporated by reference). By using free-radical forming catalysts and by manipulating polymerization kinetics (using ascertainable phase diagram data) it is believed that improved control over polymerization steps including initiation, propagation, termination is obtainable and could lead to improved control over characteristics like molecular weight and molecular weight distribution as compared with prior methods. Other advantages obtainable with the present methods and processes include improved particle size and distribution control, and relative ease of reaction and separation operations.

It is possible that the present methods may be advantageously employed in combination with one or more conventional solution, suspension, precipitation polymerization processes to produce a variety of polymers. Thus, the use of one or more suitable batch, semi-batch, continuous stirred-tank or tubular reactor systems is also within the scope of this method.

Apart from the previously discussed applications, the polymers produced by the methods and processes of the present invention are useful in a number of additional applications. Some of the applications include, without limitation specialty research polymer products such as tires, impact resistant materials, interfacial and barrier materials, stabilizers, adhesives, construction materials, structural panels or the like.

The methods and processes of the present invention can further be illustrated by reference to the following non-limiting examples.

EXAMPLE 1

Analytical grade styrene monomer is purified by washing it with (1) a 10 wt % aqueous NaOH solution to remove inhibitor therefrom; (2) deionized water, dried with distilled water; and (3) distilled water under reduced pressure using a middle fraction. Analytical grade acetone is fractionally distilled. Commercial grade AIBN, is also used. The styrene monomer, acetone, and an AIBN/acetone solution are nitrogen bubbled for at least about 15 minutes prior to being injected into a reactor system such as is the reactor system shown in FIG. 2.

Acetone (50 milliliter) at room temperature is first poured into an open 300 milliliter reactor. The reactor is sealed, stirred, and heated in a manner such that the reactor temperature will increase at a generally linear rate from about 25° C. to about 110° C. over the course of about 30 minutes. The heating of the reactant admixture causes the pressure in the reaction chamber to rise to about 2-5 psig when the temperature reaches about 50° C. At this point, the reactor is evacuated to a pressure of about 0 psig. Nitrogen gas is introduced into the reaction chamber to a pressure of about 60-63 psig.

After the temperature and pressure of the reaction chamber is stabilized at about 110° C. and 60 psig, the following reactants are selectively injected into the reactor over a period of about 250 minutes in cycles of about 150-seconds in duration:

(1) AIBN/Acetone (20 milligram AIBN in 200 milliliter Acetone) for 10 seconds per cycle at a flow rate of 6 milliliters/minute during the 10-second pumping period per cycle; and (2) Styrene for 10 seconds per cycle at a flow rate of about 6 milliliters/minute during the 10-second pumping period per cycle.

The injection rates are further monitored and controlled so that at the end of an injection period of about 250 minutes, substantially equal proportions (at least about 100 milliliters each) of styrene and AIBN/acetone fluids will have been introduced into the reactor.

The reactor conditions of about 110° C. and 60 psig are maintained for approximately 6 additional hours. Then, the temperature is lowered at a substantially linear rate to about 25° C. over the subsequent 2 hours. When a temperature of about 25° C. is reached, the run is stopped.

The resulting polystyrene product obtained from the reaction is found to have a number average molecular weight in a range of about 900 to about 1,300; an HI of about 1.1 to about 1.3; and a monomer to polymer conversion of about 92 to about 98 percent.

Referring to a phase diagram for the Polystyrene/Acetone system such as is found in Prausnitz, et al., "Molecular Thermodynamics of Fluid-Phase Equilibria", Second Edition, Prentice-hall, New Jersey, 1986, p. 570) hereby expressely incorporated by reference, it may be inferred that 110° C. and 60 psig is a condition that is above the LCST (70°-80° C.). The presence of the monomer does not significantly alter the reactor conditions because of the relatively high value of monomer to polymer conversion obtainable. Further, it is believed that most of the styrene that is injected into the reactor during each 150-seconds cycle is consumed by AIBN that decomposes.

EXAMPLE 2

Approximately 0.3 milliliters analytical grade styrene monomer, 100 milliliters analytical grade diethyl ether, and about 0.21 milligrams AIBN are admixed into a 300-milliliter reactor vessel. The reactor is sealed and is covered with suitable insulation and a heating mantle. A suitable pressure control system is used in association with a system such as the system shown in FIG. 3. The following observations are made at various designated intervals of a run.

TABLE I

| Time (min) | P (psig) | T (°C.) | Comments |
|---|---|---|---|
| 0 | 0 | 25 | Start heating |
| 8 | 55 | 87 | Hot spots observed at about 91, 97, and 95° C. |
| 13 | 57 | 88 | |
| 18 | 63 | 90 | |
| 23 | 64 | 90 | |
| 28 | 65 | 90 | Hot spot observed at about - 92° C. |
| 33 | 70 | 92 | |
| 38 | 80 | 95 | |
| 43 | 85 | 97 | |
| 48 | 90 | 98 | Pressure is set to 90 psig |
| 53 | 90 | 98 | Temperature is toggling to 97° C. |
| 58 | 90 | 97 | |
| 63 | 90 | 97 | Temperature is toggling to 96° C. |
| 68 | 90 | 96 | |
| 73 | 90 | 95 | |
| 78 | 90 | 94 | |
| 83 | 90 | 92 | |
| 88 | 90 | 92 | Sample taken from the reactor |
| 93 | 90 | 92 | Start to shutdown reactor |

TABLE I-continued

| Time (min) | P (psig) | T (°C.) | Comments |
|---|---|---|---|
| 123 | 0 | 25 | |

The sample that is taken from the reactor is observed as containing some carbon particles. The approximate volume ratio of carbon to polymer particles is 1:1, i.e., the solid product has about 50% carbon in it. Also observed is that the temperature of the system begins to lower even though the pressure is maintained at about 90 psig. As shown in Table I, during the period of about 48-88 minutes into the run, the temperature drops from 98° to 92° C. (which tends to be below the boiling temperature of the system which is about 96°-98° C.). When the reactant admixture fluid temperature is below this boiling temperature, the temperature of the particles appears to be above such boiling temperature. This occurrence and an observation of hot spots (e.g. thermal spikes) confirm that particle temperatures are generally higher than average temperatures of admixture reactants in the reactor. Due to the amount of monomer in the reactor relative to the amount of solvent (on the order of about 0.3% monomer), and the observation of carbon particles, it is believed that particle temperatures are at about the decomposition temperature of the polymer.

EXAMPLE 3

Using the reactor system of FIG. 2, double-distilled acetone (about 140 milliliters) at about room temperature is poured into an empty and sealed reactor that has been flushed with nitrogen gas. The reactor is stirred, and a nitrogen gas blanket (of about 66 psig) is introduced into the reactor. The contents of the reactor are heated to about 90° C. An admixture of 100 g AIBN, freeze-thawed styrene (about 7.5 milliliters) and double-distilled acetone (about 2.5 milliliters) is injected into the reactor. Additional double-distilled acetone (about 15 milliliters) is also added to assure that substantially all of the styrene monomer and AIBN are introduced in the reactor. The reactor pressure is raised to about 80 psig. Samples are taken at various intervals, and the following observations are made.

TABLE II

| Sample # | Time (Min.:Sec.) | Number Average Molecular Weight (g/g-mol) | HI |
|---|---|---|---|
| 1 | 2:30 | — | — |
| 2 | 4:22 | 1,700 ± 100 | 1.4 ± 0.1 |
| 3 | 6:42 | 2,300 ± 100 | 1.4 ± 0.1 |
| 4 | 8:02 | 2,700 ± 100 | 1.4 ± 0.1 |
| 5 | 12:01 | 3,000 ± 100 | 1.4 ± 0.1 |
| 6 | 16:00 | 2,500 ± 100 | 1.4 ± 0.1 |

It is observed that the molecular weight of the resulting polymer tends not to change by more than 100% in all samples. Also, the heterogeneity index (HI) is virtually unchanged in all samples.

EXAMPLE 4

Analytical grade styrene monomer is purified by washing it with a 10 wt % aqueous NaOH solution, and deionized water; and is dried with distilled water. The resulting solution is then distilled under a reduced pressure using a middle fraction. Distillate from distilled analytical grade methylethylketone (MEK) maintained at about room temperature is bubbled into the reactor system of FIG. 2 with nitrogen gas for at least about 15 minutes.

Additionally, a 100-milliliter quantity of MEK is poured into an open 300-milliliter reactor, and then the reactor is sealed. The resulting admixture of reactants is heated to about 110° C. from room temperature. During such heating, when the temperature reaches about 70° C., the reactor is opened to the atmosphere; and the pressure is evacuated to about 0 psig. A nitrogen gas blanket, at a pressure of about 40 psig, is then introduced into the reactor, which has been sealed.

When the reactor conditions are stable at about 110° C. and 40 psig, an admixture of AIBN and styrene monomer (about 0.5 g AIBN dissolved in about 99 milliliters of styrene monomer) is injected into the reactor at a flow rate of about 0.4 milliliters/56 seconds, wherein a pump is employed for only 10 seconds of every 20-second cycle. After about 4 hours and 10 minutes, this pumping procedure is stopped and the reactor conditions are maintained relatively steady. A sample is taken about 215 minutes later, and is observed to have a number average molecular weight of about 11,500 to about 21,500 g/g-mol, and an HI of about 2.7 to about 3.8.

EXAMPLE 5

Analytical grade styrene monomer is purified by washing it with a 10 wt % aqueous NaOH solution, and deionized water; and is dried with distilled water. The resulting solution is then distilled under reduced pressure using a middle fraction. Distillate from distilled analytical grade methylethylketone (MEK) maintained at about room temperature is bubbled into the reactor system of FIG. 2 with nitrogen gas for at least about 15 minutes.

Additionally, a 100-milliliter quantity of MEK is poured into an open 300-milliliter reactor, and then the reactor is sealed. The reactant admixture fluid is heated to about 110° C. from room temperature. During such heating, when the temperature reaches about 70° C., the reactor is opened to the atmosphere; and the pressure is evacuated to about 0 psig. A nitrogen gas blanket, at a pressure of 40 psig, is then introduced into the reactor, which has been sealed.

When the reactor conditions are stable at about 110° C. and 40 psig, the following are selectively injected into the reactor over a period of about 250 minutes in cycles of approximately 150-seconds in duration:

(1) V-501/MEK (about 1.25 g V-501 in about 125 milliliters MEK) for 5 seconds per cycle and a flow rate of about 6 milliliters/minute during the 5-second pumping period per cycle; and
(2) styrene monomer at an injection rate of about 10 seconds per cycle and a flow rate of about 6 milliliters/minutes during the 10-second pumping period per cycle.

The injection rates are further monitored and controlled so that at the end of an injection period of 250 minutes, at least about 100 milliliters of styrene monomer, about 50 milliliters MEK, and about 500 milligrams V-501 will have been introduced into the reactor. After about 610 minutes from the commencement of the above-mentioned pumping steps, substantially all fluids present in the reactor are withdrawn over a period of less than about 15 minutes. The reaction product is cooled in an ice bath and exposed to air.

It is observed that the resulting polymer exhibits a number average molecular weight of about 35,800 to about 37,800 g/g-mol; an HI of about 1.7 to about 1.9; and a conversion of about 20 to about 40%.

EXAMPLE 6

Acid terminated polystyrene having a relatively narrow molecular weight distribution is prepared as follows. Analytical grade styrene monomer is purified by washing it with a 10 wt % aqueous NaOH solution, and deionized water; and is dried with distilled water. The resulting solution is then distilled under reduced pressure using a middle fraction. Distillate from distilled analytical grade acetone maintained at about room temperature is bubbled into the reactor system of FIG. 2 with nitrogen gas for at least about 15 minutes.

Additionally, a 100-milliliter quantity of acetone is poured into an open 300-milliliter reactor, and then the reactor is sealed. The reactant admixture fluid is heated to about 110° C. from about room temperature. During such heating, when the temperature reaches about 70° C., the reactor is opened to the atmosphere; and the pressure is evacuated to about 0 psig. A nitrogen gas blanket, at a pressure of 60 psig, is introduced into the reactor, which has been sealed.

Analytical grade styrene monomer used in this experiment is purified by washing it with a 10 wt % aqueous NaOH solution to remove inhibitor, and deionized water; and is dried with distilled water. The resulting solution is distilled under a reduced pressure using a middle fraction. Analytical grade Acetone is distilled, and the distillate at room temperature is bubbled with nitrogen gas for at least about 15 minutes.

When the reactor conditions are stable at about 110° C. and 60 psig, the following are selectively injected into the reactor over a period of about 250 minutes in cycles of approximately 150-seconds in duration:

(1) V-501/acetone (about 0.6–0.7 g V-501 in about 50 milliliters acetone) at about 5 seconds per cycle and a flow rate of about 6 milliliters/minutes during the 5-second pumping period per cycle; and
(2) styrene monomer at an injection rate of about 10 seconds per cycle and a flow rate of 6 milliliters/minutes during the 10-second pumping period per cycle.

The injection rate is monitored and controlled so that at the end of an injection period of 250 minutes, at least about 100 milliliters of styrene monomer, about 50 milliliters acetone, and about 600–700 miligrams V-501 is introduced into the reactor. The reactor conditions are maintained for about 13 additional hours. Thereafter, a polymer product is observed having number average molecular weight of about 75,000 to about 79,000/g/g-mol; and an HI of about 1.3 to about 1.6.

EXAMPLE 7

An admixture of analytical grade monomer including methyl methacrylate (MMA) and butyl acrylate (BA) monomers is bubbled into the reactor of the system of FIG. 2 with nitrogen gas for a period of at least one hour. About 100 milliliters n-Pentane and about 100 milligrams commercial grade AIBN are admixed into a 300-milliliter reactor. The reactor is sealed and a blanket of nitrogen gas (at about 60 psig) is applied. The reactor is run as follows:

TABLE III

| Time (min) | Temp., C. | Procedure |
|---|---|---|
| 0 | 23 | Raise temperature of reactor |

TABLE III-continued

| Time (min) | Temp., C. | Procedure |
|---|---|---|
| 9 | 90 | |
| 13 | 90 | Inject about 3 ml MMA at about 6 ml/min |
| 43 | 90 | Inject about 3 ml MMA at about 6 ml/min |
| 73 | 90 | Inject about 3 ml MMA at about 6 ml/min |
| 103 | 90 | Inject about 3 ml MMA at about 6 ml/min |
| 148 | 90 | Lower temperature of reactor |
| 159 | 86 | |
| 197 | 84 | |
| 237 | 82 | |
| 252 | 81 | |
| 268 | 80 | Raise temperature of reactor |
| 274 | 94 | |
| 277 | 90 | |
| 284 | 90 | Inject about 6 ml BA at about 6 ml/min |
| 299 | 90 | Inject about 6 ml BA at about 6 ml/min |
| 311 | 90 | Inject about 6 ml BA at about 6 ml/min |
| 321 | 90 | Inject about 6 ml BA at about 6 ml/min |
| 336 | 90 | Inject about 6 ml BA at about 6 ml/min |
| 351 | 90 | Inject about 6 ml BA at about 6 ml/min |
| 366 | 90 | Inject about 6 ml BA at about 6 ml/min |
| 381 | 90 | Inject about 6 ml BA at about 6 ml/min |
| 396 | 90 | Lower temperature of reactor |
| 399 | 88 | |
| 401 | 84 | |
| 408 | 82 | |
| 412 | 79 | |
| 418 | 77 | |
| 681 | 70 | |
| 701 | 67 | |
| 702 | 65 | |
| 732 | 63 | |
| 751 | 41 | |
| 770 | 29 | |
| 784 | 26 | Shutdown reactor |

After the reactor is shutdown, it is observed that the reactor contains milky white fluid, and there is considerable scale formation in the reactor. A polymeric material is observed as fouling the reactor wall and internal protrusions of the reactor. The polymeric material is hard and appears to be mostly polymethylmethacrylate. The polymer that still exists in remaining reactant admixture fluid is rubbery, sticky, slightly transparent, and has some holding power.

A differential scanning calorimetry (DSC) analysis of this rubbery material reveals the presence of a second-order transition at about −25° C. That suggests that the rubbery material may be a random copolymer of PMMA and PBA (i.e., a polymer having a BA-r-MMA copolymer). Further, a PMMA second-order transition seems to occur at about 130° C.

BA is added after substantially all of the initiator has decomposed (the half life of AIBN at about 90° C. is about 35 minutes). Thus, it appears that the radicals are not substantially terminated while BA is being added. Also, the second-order transitions that is observed from DSC analysis indicates two polymeric domains. These domains are microscopic in scale apparently due to the transparency of the rubbery sample taken from the reactor. The fact that the material has some holding power indicates that MMA-(BA-r-MMA)-MMA copolymer is formed.

It should be noted that in Examples 3–7 polymerization unexpectedly occurs above the LCST. Carbon particles are rarely obtained, and substantially no hot spots are directly observed. Thus, it is believed that particle temperatures are below decomposition temperatures of the polymer even though their temperatures are above those of the solvent-rich medium.

Although the invention has been described with particular reference to certain preferred embodiments thereof, variations and modifications can be effected within the spirit and scope of the following claims.

What is claimed is:

1. A free radical precipitation polymerization method for producing a polymer, said method comprising the steps of:
   (1) forming an admixture of reactants including predetermined amounts of:
      (a) a monomer;
      (b) a solvent; and
      (c) a free-radical-forming agent;
   (2) initiating a free-radical precipitation polymerization reaction to form a plurality of polymer radicals;
   (3) precipitating a polymer from said polymer radicals;
   (4) maintaining said admixture of reactants at a temperature above the lower critical solution temperature of said admixture; and
   controlling the pressure and temperature of said admixture of reactants to control the rate of propagation of the polymer.

2. The method of claim 1 wherein said monomer is selected from the group consisting of styrene monomer, methyl methacrylate monomer, butyl acrylate monomer, and mixtures thereof.

3. The method of claim 2 wherein said solvent is selected from the group consisting of acetone, methylethylketone, diethyl-ether, n-pentane and mixtures thereof.

4. The method of claim 3 wherein said free radical forming agent is selected from azo initiators, peroxide initiators, or mixtures thereof.

5. The method of claim 1 wherein said free radical forming agent is an acid-functional initiator, a base functional initiator, or a mixture thereof.

6. A free radical precipitation polymerization method for producing a styrene-containing polymer, said method comprising the steps of:
   (1) forming in a reactor system an admixture of reactants including predetermined amounts of:
      (a) a styrene monomer;
      (b) a solvent selected from the group consisting of acetone, methylethylketone, diethyl-ether, n-pentane and mixtures thereof; and
      (c) a free radical forming agent selected from the group consisting of azo initiators, peroxide initiators, and mixtures thereof;
   (2) initiating a free-radical precipitation polymerization reaction to form a plurality of styrene radicals;
   (3) precipitating a styrene-containing polymer from said styrene radicals;
   (4) maintaining a polymer-rich phase of said admixture at a temperature above the lower critical solution temperature of an admixture including said solvent and said styrene-containing polymer; and
   (5) controlling the pressure and temperature of said admixture of reactants to control the rate of propagation of said styrene-containing polymer.

7. The method of claim 6 further comprising the step of:
   (6) controlling the pressure and temperature of a system containing said admixture of reactants to bring about termination of said polymer radicals.

8. The method of claim 6 wherein step (4) includes maintaining said temperature in a range of at least about 60° C.

9. The method of claim 8 wherein said reactor system is maintained at a pressure of at least about 40 psig.

10. A free radical precipitation polymerization method for producing a styrene-containing polymer, said method comprising the steps of:
(a) forming in a reactor vessel an admixture of reactants including predetermined amounts of:
(i) a styrene monomer
(ii) a solvent selected from the group consisting of acetone, methylethylketone, diethyl-ether, n-pentane, and mixtures thereof; and
(iii) a free-radical-forming agent selected from the group consisting of azo initiators, peroxide initiators, and mixtures thereof;
(b) evacuating said reactor vessel to a pressure of about 0 psig;
(c) introducing nitrogen gas into said reactor vessel until the pressure in said reactor vessel is at least about 40 psig;
(d) maintaining said reactor vessel at a temperature of about 80° C. to about 120° C.;
(e) initiating a free radical precipitation polymerization reaction to form a plurality of styrene radicals;
(f) precipitating a styrene-containing polymer from said styrene radicals;
(g) periodically mixing said admixture of reactants;
(h) controlling the rate of propagation of said styrene-containing polymer; and
(i) terminating said styrene-containing polymer.

11. The method of claim 10 wherein said solvent is acetone.

12. The method of claim 10 wherein said free radical forming agent is azoisobutyronitrile.

13. The method of claim 10 wherein said free radical forming agent is 4-4' azobis (4-cyanopentanoic acid).

14. The method of claim 10 wherein said reactor vessel is maintained at a temperature of about 90° C. to about 110° C.

15. The method of claim 10 wherein said reactor vessel is maintained at a pressure of about 60 psig to about 90 psig.

16. The method of claim 10 wherein the initial ratio of free radical forming agent to styrene monomer is about $1 \times 10^{-7}$ to about 10 milligrams of said initiator per milliliter of said monomer.

17. A free radical precipitation polymerization method for producing a polymer, said method comprising the steps of:
(1) forming an admixture of reactants including predetermined amounts of:
(a) a monomer;
(b) a solvent; and '(c) a free-radical-forming agent;
(2) initiating a free-radical precipitation polymerization reaction to form a plurality of polymer radicals;
(3) precipitating a polymer from said polymer radicals;
(4) maintaining a polymer-rich phase of said admixture of reactants at a temperature above the lower critical solution temperature of said admixture;
(5controlling the pressure and temperature of said admixture of reactants to control the rate of propagation of said polymer; and
(6) controlling the pressure and temperature of said admixture of reactants to bring about termination of said polymer radicals.

* * * * *